Patented July 1, 1924.

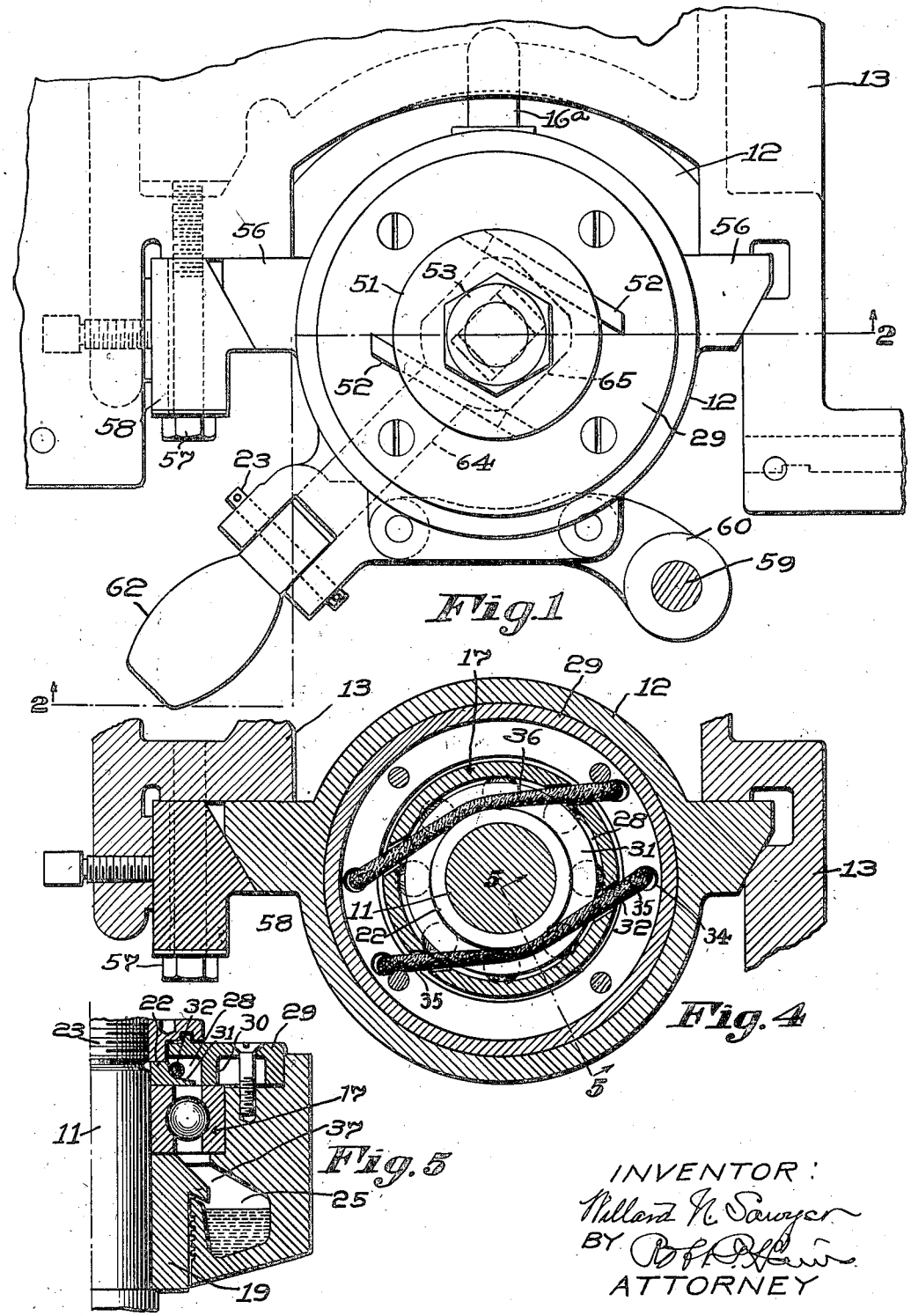

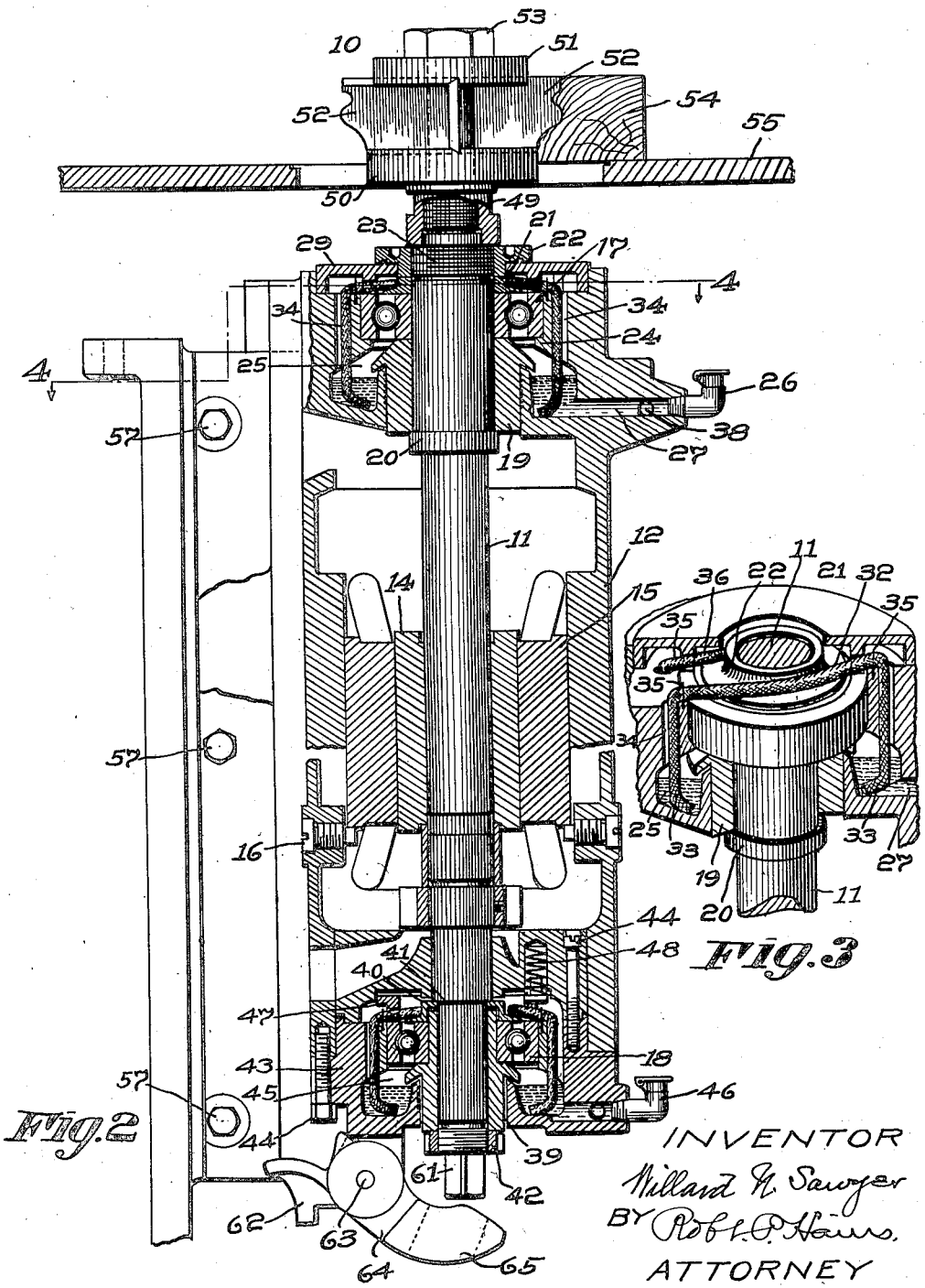

1,499,949

UNITED STATES PATENT OFFICE.

WILLARD N. SAWYER, OF WINCHENDON, MASSACHUSETTS, ASSIGNOR TO BAXTER D. WHITNEY & SON, INC., OF WINCHENDON, MASSACHUSETTS, A CORPORATION OF MASSACHUSETTS.

SPINDLE-LUBRICATING MEANS.

Application filed June 8, 1923. Serial No. 644,186.

*To all whom it may concern:*

Be it known that I, WILLARD N. SAWYER, a citizen of the United States, residing at Winchendon, in the county of Worcester and State of Massachusetts, have invented an Improvement in Spindle-Lubricating Means, of which the following description, in connection with the accompanying drawings, is a specification, like characters on the drawings representing like parts.

This invention relates to novel means for lubricating the bearings for the cutter operating spindle of a wood shaper.

The cutter operating spindles of wood shapers are necessarily made relatively heavy to support the cutter head with sufficient rigidity, and these spindles are usually driven at a high speed, the operating speed in most cases being in excess of 7000 revolutions per minute. As a result of the high speed at which these relatively heavy spindles are operated, difficulty has been experienced heretofore in keeping the spindle bearings lubricated properly.

It is essential that a small amount of lubricant be supplied continuously to the bearings of a cutter operating spindle throughout its operation, but the amount of lubricant supplied should not exceed that required for lubricating purposes, because any accumulation of the lubricant around the moving parts in excess of that required to lubricate the parts, increases the friction of the operating parts.

An excess in the supply of lubricant to the bearings of shafts which do not operate at a high speed will not appreciably increase the resistance of the working parts, but where the speed is high the lubricant becomes hot, and its accumulation around the rapidly moving parts produces a substantial amount of resistance.

An important feature of the present invention therefore resides in lubricating means for the spindle of a cutting machine which will supply lubricant to the spindle bearing at the desired rate of speed as long as the spindle rotates, but will not convey lubricant to the bearing while the spindle is still.

A more specific feature of the invention resides in a bearing for a vertical spindle having a closed casing adjacent the bearing, and a slinger rotated by the spindle to throw oil supplied to the slinger outwardly into the casing in the form of a mist that circulates around the bearing parts to supply the required amount of lubricant to the bearing.

Another important feature of the invention resides in a wick the end or ends of which are supplied with a lubricant and an intermediate portion of the wick is held in a stretched condition and in contact with a rotating slinger to convey lubricant to the latter.

In wood shapers the cutter head is usually secured by threads to an end of the operating spindle, and it is desirable to provide means for holding the operating spindle from rotation while the cutter head is being secured to or removed from the spindle. The holding means should be so constructed that it may be readily moved into firm holding engagement with the spindle and easily disengaged from the spindle.

Still another feature of the invention, therefore, resides in a treadle pivotally secured to a fixed support and having a wrench upon its inner end adapted to be moved by the treadle into holding engagement with the lower end of the cutter operating spindle to hold the spindle from rotation.

Other features of the invention and novel combination of parts in addition to the above will be hereinafter described in connection with the accompanying drawings which illustrate one good practical form thereof.

In the drawings:

Fig. 1 is a top plan view of a portion of a wood shaper, showing the cutter head and associated parts.

Fig. 2 is a vertical sectional view taken on the line 2—2 of Fig. 1.

Fig. 3 is a perspective view with parts in section of the upper bearing and associate lubricating means.

Fig. 4 is a horizontal sectional view taken on the line 4—4 of Fig. 2; and

Fig. 5 is an enlarged sectional view taken on the line 5—5 of Fig. 4.

In the drawings is shown the cutter operating portion of a wood shaper in which the cutter head 10 is operatively secured to a vertical spindle 11, and the spindle 11 is rotatively mounted within a hollow casing 12 which is slidably secured to an upright portion 13 of the supporting frame.

Within the hollow casing 12 is mounted an electric motor which drives the spindle 11, and this motor consists of a rotor 14 which is rigidly secured to the spindle 11, and a stator 15 which preferably fits snugly within the casing 12 and is supported in the desired position therein by bolts 16, and current may be supplied to the motor by wiring, not shown, extending inwardly through the conduit 16ª shown in Fig. 1.

The spindle 11 is provided with an antifriction bearing 17 mounted within the upper portion of the casing 12, and a second antifriction bearing 18 mounted at the lower portion of the casing 12, and these bearings may be of either the ball or the roller type, the ball type being shown. The bearing 17 is shown as provided with an inner ring which surrounds the upper portion of the spindle and rests upon a sleeve 19 which embraces the spindle and this sleeve rests upon a shoulder 20. Upon the upper end of the inner ring of the bearing rests a slinger 21, to be more fully described, and the inner ring is clamped rigidly to the spindle by tightening the nut 22 having threaded engagement with the threads 23 of the spindle. The outer ring of the bearing 17 is seated within an annular recess formed in the upper end of the casing 12 and rests upon a shoulder 24 extending inwardly at the bottom of said recess. The casing 12 is constructed to form an oil receptacle 25 which surrounds the sleeve 19 and is positioned below the bearing 17, and the chamber 25 may be filled to the desired level by pouring oil into the oil cups 26 which communicate with the oil receptacle 25 through an oil passage 27.

As stated an important feature of the present invention resides in means for supplying oil or other lubrication to the bearing 17 at the desired rate of speed so that the bearing will be kept properly lubricated but will not be supplied with an excess amount of oil, and means to this end will now be described. The slinger 21, in the embodiment of the invention shown, is mounted upon the spindle 11 above the bearing 17 and rotates within a relatively small chamber 28 formed by a cover plate 29 secured about the spindle at the upper end of the casing 12. This cover plate is provided with a downwardly extending annular flange 30, best shown in Fig. 5 as extending into engagement with the outer ring of the bearing 17, and the flange 30 forms the outer annular wall of the chamber 28. The slinger 22 has an outwardly extending flange portion 31 which serves to throw outwardly into the chamber 28 the oil supplied to the slinger by the wick 32. The wick preferably is mounted within the casing 12, as best shown in Fig. 3, wherein it will be seen that the opposite ends 33 of the wick extend downwardly into the oil receptacle 25, and that an intermediate portion of the wick is stretched across the chamber 28 so that a central portion of the wick engages the slinger 22 and preferably rests upon the outwardly extending flange 31 of the slinger. The end portions 33 of the wick extend upwardly through holes 34 into the enclosure of the cover plate 29, and then extend through notches formed in the annular flange 30 and into the chamber 28, and the laterally extending portion of the wick is preferably stretched taut and may be secured in this position by pins 35 extending upwardly from the upper end of the casing 12 and projecting through the wick.

As a result of the arrangement of the wick just described, oil will travel, due to capillary attraction up each end portion 33 of the wick towards the intermediate portion contacting with the slinger, and since the laterally extending portion of the wick is held taut by the pins 35 the wick will remain in its proper position irrespective of the direction in which the spindle 11 rotates. The wick 32 is preferably made round in the form of a cord, as best shown in Fig. 5, and is comparatively small in diameter, with the result that it will conduct a comparatively small amount of oil to the slinger. In the construction shown a second wick 36 is provided similar to the wick 32, but positioned upon the opposite side of the spindle 11, as will be clear from Fig. 4. The second wick 36 helps to insure the continuous supply of oil to the slinger throughout the rotation of the spindle 11, and by providing two wicks, one will remain to convey oil to the slinger should the other become incapacitated.

Due to the high speed at which the spindle 11 rotates the small amount of oil which is conveyed to the slinger by the wicks will be thrown outwardly into the chamber 28 in the form of a mist which will remain more or less suspended in the air within the chamber 28, and this misty air will circulate in the chamber and down about the bearing parts to oil the bearing, and as a result all parts of the bearing will be properly lubricated without receiving an excess amount of oil. Such oil as may drain from the bearing parts will move downwardly through the passage 37 which leads from the bearing into the oil receptacle 25, and in this way the oil may be used repeatedly without being wasted. The supply of oil within the chamber 25 will be controlled by the oil cup 26, since this cup may be filled until the oil runs over its edge, and escapes to thereby prevent the oil chamber 25 from being filled above a predetermined level.

Should it be desired to change the oil within the chamber 25, this may be done by opening the drain hole 38, shown in Fig. 2.

The bearing 18 at the lower end of the spindle 11 may be similarly constructed to the bearing 17, and is shown as provided with an inner ring which is mounted upon a sleeve 39 and is clamped between a shoulder upon this sleeve and a slinger 40 which rests upon the upper face of the inner ring and is confined between the same and a shoulder 41 upon the spindle. The arrangement is such that the sleeve 39, inner ring of the bearing 18, and the slinger 40, are clamped in position by tightening the nut 42 at the lower end of the spindle 11. The outer ring of the bearing 18 fits snugly within an annular passage formed within an end plate 43 secured to the lower end of the casing 12 by bolts 44. The end plate 43 is constructed to form an oil receptacle 45 similar to the oil receptacle 25, and may be filled from the oil cup 46. A relatively small air chamber is formed about the slinger 40 by providing the ring 47 within the space between the lower end of the casing 12 and the end plate 43, and this ring may be provided with one or more springs 48 which holds the same in engagement with the outer ring of the bearing 18 upon which the ring 47 rests. The bearing 18 like the bearing 17 is shown as provided with two wicks each of which has opposite ends extending into the oil chamber 45, and has an intermediate portion extending across the chamber in which the slinger rotates, and is supported in contact with the slinger 40.

By providing the oil receptacles 25 and 45 below the respective bearings 17 and 18 and by providing wicks to carry the oil upwardly from the oil chambers to the slingers, a construction is obtained in which oil is supplied to the bearings 17 and 18 only upon rotation of the spindle 11, because the wicks will not convey sufficient oil to the slingers to drip or creep from the latter when they are not rotating, but will serve to moisten the slingers as they rotate, and the small amount of oil conveyed to the slingers will be immediately thrown outwardly in the form of a mist, due to the high speed at which the slingers rotate.

The cutter head 10 usually consists of a stub shaft 49 upon which are mounted a lower washer 50 and an upper washer 51 between which the cutter blades 52 are clamped and the blades are secured in the desired position of adjustment by tightening the nut 53 at the upper end of the stub shaft, and the entire cutter head may be secured to the spindle 11 by screwing the stub shaft 49 on to the threads at the upper end of the spindle 11. The cutting edge of the blades 52 may be given any desired contour depending upon the operation to be performed upon the work 54, and during the cutting operation the work rests upon a table 55, and the lower edge of the work may rest against the annular face of the washer 50, which washer serves to guide the work past the rotating cutting blades.

It is desirable to provide means for adjusting the spindle 11 and cutter head vertically, and the casing 12 is therefore provided with oppositely extending flanges 56 which are slidably secured to the upright 13, and the casing 12 may be clamped in the desired position of vertical adjustment by tightening the bolts 57 which secure the gib 58 in place. The casing 12 may be adjusted vertically by an adjusting screw 59 which engages a bracket 60 secured to the casing 12.

In securing the cutter head 10 to the spindle 11 and removing it therefrom it is desirable to hold the spindle 11 from rotating while the head 10 is being screwed tightly to the spindle or released therefrom, and to this end in the construction shown, the spindle 11 has at its lower end the opposite sides cut away as at 61 to form a square head adapted to be gripped by the jaws of a wrench, and near the lower end of the spindle 11 is mounted a foot treadle 62 which is rockingly supported by the pivot pin 63, and this foot treadle has an inwardly extending lever 64 provided at its inner end with a wrench 65 adapted to engage the squared head 61 at the lower end of the spindle 11. The construction is such that the weight of the inner end of the lever 64 will cause the same to normally lie in the position shown in Fig. 2, in which the wrench is out of engagement with the head 61 but is so disposed that if pressure is placed upon the treadle 62 the wrench will be swung upwardly and held in gripping engagement with the head 61 to prevent the spindle 11 from rotating, and as soon as the pressure is removed from the treadle the wrench will, due to its weight, move downwardly out of engagement with the head 61.

What is claimed is:

1. In combination with a wood shaper having a vertical spindle for operating a cutter head, an antifriction bearing for the spindle mounted in a closed casing, and lubricating means for the bearing including, an oil receptacle below the bearing, an oil slinger within the casing and secured to the spindle above the bearing for rotation by the spindle, and a wick extending upwardly from the oil receptacle into contact with the slinger and adapted to convey oil to the slinger to be thrown outwardly by the latter in the form of an oily mist that lubricates the bearing.

2. In combination with a wood shaper having a vertical spindle for operating a cutter head, an antifriction bearing for the spindle mounted in a closed casing, and lubricating means for the bearing including, an oil slinger within the casing and secured to the spindle above the bearing for rotation by the spindle, and a wick extending into contact with the slinger and adapted to convey oil to the slinger to be thrown outwardly by the latter in the form of an oily mist that lubricates the bearing.

3. In combination with a shaper having a vertical spindle for operating a cutter head, a ball bearing for the spindle mounted in a closed casing, and lubricating means for the bearing including, an oil slinger within the casing and secured to the spindle for rotation by the spindle, and a wick extending upwardly from a supply of oil and contacting with the slinger at a point a substantial distance above the supply of oil and adapted to convey oil by capillary attraction to the slinger to be thrown outwardly by the latter in the form of an oily mist that fills the casing and circulates around the bearing parts to lubricate them.

4. In combination with a cutting machine having a vertical spindle for operating a cutting tool, a bearing for the spindle, a casing for the bearing constructed to form an air chamber above the bearing and an oil chamber below the bearing, and lubricating means for the bearing including, an oil slinger mounted upon the spindle to rotate in the air chamber, and a wick extending from the oil chamber into contact with the slinger to convey oil to the slinger so that the oil will be thrown outwardly by the slinger in the form of an oily mist that lubricates the bearing.

5. In combination with a cutting machine having a vertical spindle for operating a cutting tool, a bearing for the spindle, a casing for the bearing constructed to form an air chamber above the bearing and an oil chamber below the bearing to receive oil that escapes from the bearing, and lubricating means for the bearing including an oil slinger mounted in the air chamber for rotation by the spindle, a wick extending from the oil chamber into contact with the slinger to moisten the latter with oil so that the speed of the slinger will throw the oil outwardly in the form of an oily mist that circulates within the casing and contacts with the bearing parts to lubricate them.

6. In combination with a cutting machine having a vertical spindle for operating a cutting tool, a bearing for the spindle mounted in a closed casing, and lubricating means for the bearing including, an oil slinger within the casing and secured to the spindle for rotation by the spindle, and a wick extending from a supply of oil and having an intermediate portion stretched across the face of the slinger and held at each side of the slinger to convey oil to the slinger so that it will be thrown outwardly by the slinger in the form of a mist that lubricates the bearing.

7. In combination with a cutting machine having a vertical spindle for operating a cutting tool, a bearing for the spindle mounted in a closed casing, and lubricating means for the bearing including an oil slinger within the casing and rotated by the spindle, and a wick extending from a supply of oil and stretched across the casing in a taut condition with an intermediate portion contacting with a face of the slinger and held at each side of the slinger to moisten it with oil so that the speed of the slinger will throw the oil outwardly in the form of an oily mist that lubricates the bearing.

8. In combination with a cutting machine having a verticle spindle for operating a cutting tool, an antifriction bearing for the spindle mounted in a closed casing, and lubricating means for the bearing including an oil receptacle mounted below the bearing, an oil slinger secured to the spindle at a substantial distance above the oil receptacle and having an outwardly extending flange for throwing oil outwardly into the casing in the form of an oily mist that floats within the casing and deposits upon the bearing parts, and a wick extending from the oil receptacle into contact with the slinger to supply oil to the latter.

9. In combination with a cutting machine having a vertical spindle for operating a cutting tool, a bearing for the spindle mounted in a casing, and lubricating means for the bearing including an oil slinger within the casing and rotated by the spindle, and a wick having oil supplied to its opposite ends and having its intermediate portion stretched across the casing in contact with a face of the slinger so that oil is conducted by capillary attraction along each end portion of the wick toward the intermediate portion to moisten the slinger and cause the speed of the slinger to throw the oil outwardly into the chamber to move downwardly into the bearing.

In testimony whereof, I have signed my name to this specification.

WILLARD N. SAWYER.